(12) United States Patent
Villaron (10) Patent No.: US 10,824,787 B2
(45) Date of Patent: Nov. 3, 2020

(54) AUTHORING THROUGH CROWDSOURCING BASED SUGGESTIONS

(71) Applicant: Microsoft Technology Licensing, LLC, Redmond, WA (US)

(72) Inventor: Shawn Villaron, Mountain View, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 169 days.

(21) Appl. No.: 14/578,464

(22) Filed: Dec. 21, 2014

(65) Prior Publication Data

US 2015/0180966 A1 Jun. 25, 2015

Related U.S. Application Data

(60) Provisional application No. 61/919,715, filed on Dec. 21, 2013.

(51) Int. Cl.
*G06F 40/103* (2020.01)
*G06Q 10/10* (2012.01)
*G06F 3/0484* (2013.01)
*G06F 3/0483* (2013.01)
*G06Q 50/00* (2012.01)

(52) U.S. Cl.
CPC .......... *G06F 40/103* (2020.01); *G06F 3/0483* (2013.01); *G06F 3/0484* (2013.01); *G06Q 10/10* (2013.01); *G06Q 10/101* (2013.01); *G06Q 50/01* (2013.01)

(58) Field of Classification Search
CPC . G06F 3/048–04886; G06F 17/20–218; G06F 17/24–248
See application file for complete search history.

(56) References Cited

U.S. PATENT DOCUMENTS

| | | | | |
|---|---|---|---|---|
| 6,021,403 A | * | 2/2000 | Horvitz | G06N 5/00 706/45 |
| 6,262,730 B1 | * | 7/2001 | Horvitz | G06F 9/4446 715/707 |
| 6,366,923 B1 | | 4/2002 | Lenk et al. | |

(Continued)

FOREIGN PATENT DOCUMENTS

| | | |
|---|---|---|
| CN | 101454774 A | 6/2009 |
| CN | 101542473 A | 9/2009 |

(Continued)

OTHER PUBLICATIONS

"Collaborating in Really Real-Time", http://etherpad.org/, Feb. 6, 2013, 4 Pages.

(Continued)

*Primary Examiner* — Matthew Ell
*Assistant Examiner* — Linda Huynh (57) ABSTRACT

Technologies are generally provided for enabling authors to create and/or modify content such as content itself, style, format based options for creating a document or similar content by determining authors' intent and providing suggestions associated with content actions based on collected crowdsourcing data. Author intent and suggestions may be determined from a variety of crowdsourcing information associated with one or more attributes of the author, the content, and the environment in which the content is being created/modified.

20 Claims, 7 Drawing Sheets

(56) References Cited

U.S. PATENT DOCUMENTS

| | | | |
|---|---|---|---|
| 6,553,358 B1* | 4/2003 | Horvitz | G06Q 10/107 705/39 |
| 6,732,090 B2 | 5/2004 | Shanahan et al. | |
| 7,149,970 B1 | 12/2006 | Pratley et al. | |
| 7,509,345 B2 | 3/2009 | DeSpain et al. | |
| 7,519,573 B2 | 4/2009 | Helfman et al. | |
| 7,623,710 B2* | 11/2009 | Simard | G06K 9/00442 382/175 |
| 7,933,952 B2 | 4/2011 | Parker et al. | |
| 7,962,853 B2 | 6/2011 | Bedi et al. | |
| 8,032,470 B1* | 10/2011 | Heidenreich | G06Q 10/10 706/45 |
| 8,073,811 B2 | 12/2011 | Stratheam et al. | |
| 8,229,795 B1 | 7/2012 | Myslinski | |
| 8,239,455 B2 | 8/2012 | Wang | |
| 8,290,772 B1 | 10/2012 | Cohen et al. | |
| 8,464,150 B2 | 6/2013 | Davidson et al. | |
| 8,825,758 B2 | 9/2014 | Bailor et al. | |
| 8,832,188 B1 | 9/2014 | Cierniak | |
| 9,183,172 B1* | 11/2015 | Anderson | H04N 21/4788 |
| 9,553,902 B1* | 1/2017 | Cherukuri | G06F 40/186 |
| 9,715,476 B2 | 7/2017 | Megiddo et al. | |
| 2004/0085354 A1 | 5/2004 | Massand | |
| 2006/0026502 A1 | 2/2006 | Dutta | |
| 2006/0041589 A1 | 2/2006 | Helfman et al. | |
| 2006/0075353 A1 | 4/2006 | Despain et al. | |
| 2006/0248071 A1 | 11/2006 | Campbell et al. | |
| 2007/0106952 A1 | 5/2007 | Matas et al. | |
| 2007/0220480 A1 | 9/2007 | Waldman et al. | |
| 2008/0059539 A1 | 3/2008 | Chin et al. | |
| 2008/0098294 A1 | 4/2008 | Le | |
| 2008/0104061 A1 | 5/2008 | Rezaei | |
| 2009/0157811 A1 | 6/2009 | Bailor et al. | |
| 2009/0164394 A1* | 6/2009 | Multerer | G06Q 10/10 706/12 |
| 2009/0271696 A1 | 10/2009 | Bailor et al. | |
| 2010/0004944 A1 | 1/2010 | Palaniappan | |
| 2010/0106703 A1 | 4/2010 | Cramer | |
| 2010/0235763 A1* | 9/2010 | Massand | G06F 40/166 715/753 |
| 2010/0257457 A1 | 10/2010 | De Goes | |
| 2010/0325016 A1 | 12/2010 | Marcus et al. | |
| 2011/0022662 A1 | 1/2011 | Barber-mingo et al. | |
| 2011/0208822 A1 | 8/2011 | Rathod | |
| 2011/0213655 A1 | 9/2011 | Henkin et al. | |
| 2012/0023418 A1 | 1/2012 | Frields et al. | |
| 2012/0060098 A1 | 3/2012 | Libin et al. | |
| 2012/0117463 A1* | 5/2012 | Inglis | G06F 40/58 715/255 |
| 2012/0144316 A1* | 6/2012 | Deng | G06Q 30/02 715/751 |
| 2012/0233543 A1 | 9/2012 | Vagell et al. | |
| 2012/0245996 A1 | 9/2012 | Mendez et al. | |
| 2012/0246719 A1* | 9/2012 | Bhamidipaty | H04L 63/10 726/22 |
| 2012/0260155 A1 | 10/2012 | Krieger et al. | |
| 2012/0278401 A1* | 11/2012 | Meisels | G06F 17/24 709/206 |
| 2012/0284344 A1* | 11/2012 | Costenaro | G06F 17/241 709/206 |
| 2012/0331057 A1 | 12/2012 | Rothschild | |
| 2013/0179515 A1 | 7/2013 | Chi et al. | |
| 2013/0218845 A1 | 8/2013 | Kleppner et al. | |
| 2013/0268849 A1* | 10/2013 | Du | G06Q 10/10 715/255 |
| 2013/0275892 A1* | 10/2013 | Li | G06F 3/04817 715/762 |
| 2013/0283147 A1 | 10/2013 | Wong et al. | |
| 2013/0311329 A1 | 11/2013 | Knudson et al. | |
| 2014/0033068 A1 | 1/2014 | Gupta et al. | |
| 2014/0149857 A1* | 5/2014 | Vagell | G06F 40/166 715/255 |
| 2014/0195899 A1 | 7/2014 | Bastide et al. | |
| 2014/0201623 A1 | 7/2014 | Kattner et al. | |
| 2014/0233919 A1 | 8/2014 | Sabatino | |
| 2014/0281875 A1 | 9/2014 | Branton et al. | |
| 2014/0281951 A1 | 9/2014 | Megiddo et al. | |
| 2014/0289645 A1 | 9/2014 | Megiddo et al. | |
| 2014/0310613 A1 | 10/2014 | Megiddo et al. | |
| 2014/0365207 A1* | 12/2014 | Convertino | G06F 17/2785 704/9 |
| 2015/0074516 A1* | 3/2015 | Ben-Aharon | G06F 17/2247 715/234 |
| 2015/0113390 A1* | 4/2015 | Vagell | G06F 17/24 715/255 |
| 2015/0177925 A1 | 6/2015 | Villaron | |
| 2015/0178391 A1 | 6/2015 | Villaron | |
| 2016/0110029 A1 | 4/2016 | Megiddo et al. | |
| 2019/0339819 A1 | 11/2019 | Megiddo et al. | |

FOREIGN PATENT DOCUMENTS

| | | |
|---|---|---|
| CN | 102945226 A | 2/2013 |
| EP | 1548611 A2 | 6/2005 |

OTHER PUBLICATIONS

"Overview of co-authoring in SharePoint 2013", Retrieved from: http://technet.microsoft.com/en-us/library/ff718249.aspx, Jan. 15, 2013, 6 Pages.

"VisualCV: Dynamic Web Resume Builder", Retrieved at http://web.archive.org/web/20090426064510/http://www.makeuseof.com/dir/visualcv/, Retrieved on Apr. 23, 2009, 4 Pages.

"Final Office Action Issued in U.S. Appl. No. 13/827,196", dated Sep. 25, 2015, 30 Pages.

"Final Office Action Issued in U.S. Appl. No. 13/827,196", dated Apr. 5, 2016, 33 Pages.

"Final Office Action Issued in U.S. Appl. No. 13/827,196", dated Feb. 22, 2017, 39 Pages.

"Office Action Issued in U.S. Appl. No. 13/827,196", dated Dec. 11, 2015, 31 Pages.

"Office Action Issued in U.S. Appl. No. 13/827,196", dated Oct. 5, 2016, 32 Pages.

"Office Action Issued in U.S. Appl. No. 13/827,196", dated Apr. 1, 2015, 28 Pages.

"Non-Final Office Action Issued in U.S. Appl. No. 13/848,027", dated Jun. 1, 2015, 13 Pages.

"Final Office Action Issued in U.S. Appl. No. 13/860,127", dated Dec. 16, 2015, 24 Pages.

"Non-Final Office Action Issued in U.S. Appl. No. 13/860,127", dated Sep. 21, 2016, 22 Pages.

"Non-Final Office Action Issued in U.S. Appl. No. 13/860,127", dated Jun. 12, 2015, 18 Pages.

"Final Office Action Issued in U.S. Appl. No. 13/863,323", dated Feb. 9, 2017, 15 Pages.

"Final Office Action Issued in U.S. Appl. No. 13/863,323", dated Aug. 27, 2015, 14 Pages.

"Non-final Office Action Issued in U.S. Appl. No. 13/863,323", dated Feb. 27, 2015, 14 Pages.

"Non-Final Office Action Issued in U.S. Appl. No. 13/863,323", dated Jul. 29, 2016, 14 Pages.

"Final Office Action Issued in U.S. Appl. No. 14/578,461", dated Jul. 19, 2017, 13 Pages.

"Final Office Action Issued in U.S. Appl. No. 14/578,461", dated Jul. 11, 2018, 20 Pages.

"Non-Final Office Action Issued in U.S. Appl. No. 14/578,461", dated Dec. 22, 2017, 18 Pages.

"Non-Final Office Action Issued in U.S. Appl. No. 14/578,461", dated Feb. 21, 2017, 15 Pages.

"Final Office Action Issued in U.S. Appl. No. 14/578,466", dated Oct. 2, 2017, 21 Pages.

"Non Final Office Action Issued in U.S. Appl. No. 14/578,466", dated Apr. 25, 2018, 17 Pages.

"Non-final Office Action Issued in U.S. Appl. No. 14/578,466", dated Mar. 23, 2017, 19 Pages.

"Non Final Office Action Issued in U.S. Appl. No. 14/981,974", dated Sep. 25, 2018, 20 Pages.

(56) References Cited

OTHER PUBLICATIONS

"Office action Issued in U.S. Appl. No. 14/981,974", dated Nov. 2, 2017, 19 Pages.
"Office action Issued in U.S. Appl. No. 14/981,974", dated Mar. 15, 2018, 20 Pages.
"Office Action Issued in European Patent Application No. 14720011.7", dated May 15, 2018, 6 Pages.
"Office Action Issued in European Patent Application No. 14725859A", dated Jul. 21, 2016, 3 Pages.
"Office action Issued in European Patent Application No. 14725859A", dated Feb. 8, 2018, 4 Pages.
"First Office Action and Search Report Issued in Chinese Patent Application No. 201480016449.5", dated Feb. 15, 2017, 18 Pages.
"Office action Issued in Chinese Patent Application No. 201480021498.8", dated Feb. 5, 2018, 9 Pages.
Halder, Soumen, "Memonic: A Web Clipping Tool to Capture and Share Web Content", https://www.maketecheasier.com/memonic-web-clipping-tool-to-share-web-content/, Jul. 17, 2010, 10 Pages.
Hickey, Kasey Fleisher, "Did You Know: How to Clip Web Content", Retrieved at https://blog.evernote.com/blog/2011/05/13/did-you-know-how-to-clip-web-content/,May 13, 2011, 6 Pages.
Mahlow, et al., "Linguistic Support for Revising and Editing", In Proceedings of the 9th International Conference on Computational Linguistics and Intelligent Text Processing, Feb. 17, 2008, 14 Pages.
Miller, et al., "LAPIS: Smart Editing with Text Structure", In Extended Abstracts on Human Factors in Computing Systems, Apr. 20, 2002, 2 Pages.
Parr, et al., "Google Docs Improves Commenting, Adds E-mail Notifications", http://mashable.com/2011/03/16/google-docs-discussions/, Mar. 16, 2011, 6 Pages.
"International Preliminary Report on Patentability Issued in PCT Application No. PCT/US2014/031144", dated Jul. 8, 2015, 8 Pages.
"International Search Report and Written Opinion Issued in PCT Application No. PCT/US2014/031144", dated Jul. 1, 2014, 11 Pages.
"Second Written Opinion Issued in PCT Application No. PCT/US2014/031144", dated Feb. 4, 2015, 5 Pages.
"International Preliminary Report on Patentability Issued in PCT Patent Application No. PCT/US2014/033906", dated Apr. 17, 2015, 6 Pages.
"International Search Report & Written Opinion Issued in PCT Patent Application No. PCT/US2014/033906", dated Sep. 8, 2014, 9 Pages.
"Second Written Opinion Issued in PCT Application No. PCT/US2014/033906", dated Mar. 6, 2015, 5 Pages.
Rigsby, Josette, "Microsoft Add Real-Time Collaboration to Office Web Application", http://www.cmswire.com/cms/enterprise-collaboration/microsoft-add-realtime-collaboration-to-office-web-application-011945.php, 3 Pages.
W3schools, "CSS Reference", http://www.w3schools.com/cssref/default.asp, 8 Pages.
"Non Final Office Action Issued in U.S. Appl. No. 14/578,466", dated Jun. 12, 2019, 21 Pages.
"Final Office Action Issued in U.S. Appl. No. 14/578,466", dated Dec. 5, 2018, 17 Pages.
"Non Final Office Action Issued in U.S. Appl. No. 14/578,461", dated Jul. 18, 2019, 19 Pages.
"Non Final Office Action Issued in U.S. Appl. No. 16/417,530", dated May 19, 2020, 21 Pages.
"Final Office Action Issued in U.S. Appl. No. 14/578,466", dated Dec. 16, 2019, 16 Pages.
"Office Action Issued in Indian Patent Application No. 6413/CHENP/2015", dated Apr. 24, 2020, 6 Pages.
"Final Office Action Issued in U.S. Appl. No. 14/578,461", dated Mar. 17, 2020, 17 Pages.

* cited by examiner

AUTHORING THROUGH CROWDSOURCING BASED SUGGESTIONS

CROSS-REFERENCE TO RELATED APPLICATION

This application claims the benefit under 35 U.S.C. §119 (e) of U.S. Provisional Application Ser. No. 61/919,715 filed on Dec. 21, 2013. The Provisional application is herein incorporated by reference in its entirety.

BACKGROUND

Content processing applications and services, especially textual content, provide a number of controls for selecting, modifying aspects of content such as formatting, grammatical or stylistic corrections, even word replacements through synonym/antonym suggestions. In typical systems, such controls are available individually, sometimes independently or interdependently. Thus, users may be enabled to select and modify aspects of content they create or process, but they have to do it manually.

Furthermore, creating content to match a particular style (not necessarily formatting, but prose style) is mostly a manual process left to the user in conventional applications. For example, if an organization has a particular preference for not only formatting, but also choice of words, sentence structure, and similar aspects of documents created by its members, it may be a process left to individual users to learn and apply the organization's preferences.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling authors to create and/or modify content by determining their intent and providing suggestions associated with content actions based on collected crowdsourcing data. Author intent and suggestions may be determined from a variety of crowdsourced information associated with one or more attributes of the author, the content, and the environment in which the content is being created/modified. Author inputs and selections may be used to further fine-tune suggestions and intent determination and focusing of crowdsourcing data.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, authors may be enabled to create and/or modify content by determining their intent and providing suggestions associated with content actions based on collected crowdsourcing data. Content, style, format based options for creating a document or similar content may be presented by suggesting choices based on global or local search results, organizational choices, peers'/superiors'/friends'/etc. choices, social or professional network based inferences, influencers' choices, and so on.

An application executed as a locally installed application by a processing unit of a computing device in a local computing environment may provide suggestions associated with content actions based on collected crowdsourcing data. In other examples, the application may be part of a hosted service executed on a server and accessed by client devices through a network. The suggestions provided by the application may increase the efficiency in creation of the content. The suggestions may also enable users to create and process content individually and/or collaboratively. The application may determine author intent based on factors associated with the user that include, among others, crowd-sourcing. Based on the determined intent, the application may provide suggestions for automated content actions that include one or more of: placement, formatting, style selection, relationships between content elements, size and attribute selection for content elements, layout of content elements, animations, transitions, and/or accessibility options. The suggested content actions may be performed upon author selection or automatically. There may be other advantageous uses of the application beyond the ones listed herein.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for authoring through crowdsourcing based suggestions. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
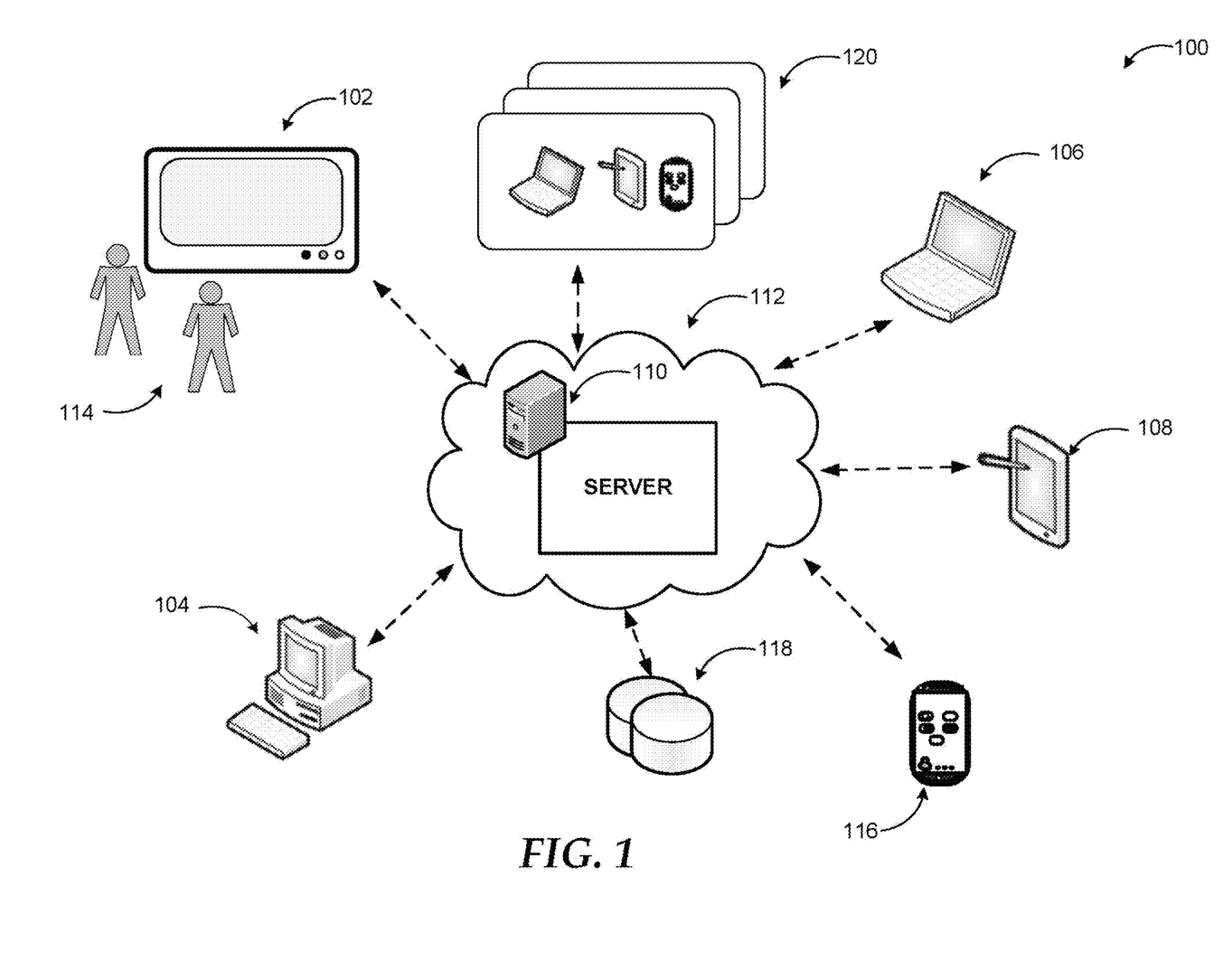
FIG. 1 includes a conceptual diagram illustrating a local and networked configuration environment, where authoring through crowdsourcing based suggestions may be implemented.

Referring to FIG. 1, conceptual diagram 100 illustrates a local and networked configuration environment, where authoring through crowdsourcing based suggestions may be implemented. The computing devices and computing environments shown in diagram 100 are for illustration purposes. Embodiments may be implemented in various local, networked, and similar computing environments employing a variety of computing devices and systems.

Diagram 100 represents local computing environment in a computing device 106, where an authoring application may enable one or more users such as users 114 to create and process content individually or collaboratively. The authoring application may be executed as a locally installed application on a desktop computer 104, a laptop computer 106, a tablet 108, a smart phone 116, a smart whiteboard 102, and similar devices. The authoring application may also be part of a hosted service executed on a server 110 and accessed by client devices through a network 112.

The authoring application may determine author intent based on a number of factors associated with the author, a document (including the content) being created, an environment associated with the author/content (e.g., a collaboration environment), and external factors such as crowdsourcing. Crowdsourcing may take into consideration choices based on global or local search results, organizational choices, peers'/superiors'/friends'/etc. choices, social or professional network based inferences, influencers' choices, and similar ones. Various sources for crowdsourcing based information are represented in diagram 100 by the representative user devices 120 and data stores 118. Thus, crowdsourcing information may be received from individual users in the above-listed and similar categories or from already collected crowdsourcing data.

Based on the determined intent, the authoring application may provide suggestions for automated content actions such as placement, formatting, style selection, relationships between content elements, size and attribute selection for content elements, layout of content elements, animations, transitions, and/or accessibility options. The suggested content actions may be performed upon author selection or automatically. In some embodiments, suggested content based on the above attributes may be displayed to enabled the author view how the suggestion based automatic content creation works.

The authoring application may be a word processing application, a presentation application, a spreadsheet application, a note taking application, a collaboration application with a content editing module, and comparable ones.

The example systems in FIG. 1 have been described with specific servers, client devices, applications, and interactions. Embodiments are not limited to systems according to these, example configurations. A platform providing authoring through crowdsourcing based suggestions may be implemented in configurations employing fewer or additional components and performing other tasks. Furthermore, specific protocols and/or interfaces may be implemented in a similar manner using the principles described herein.

Figure 2:
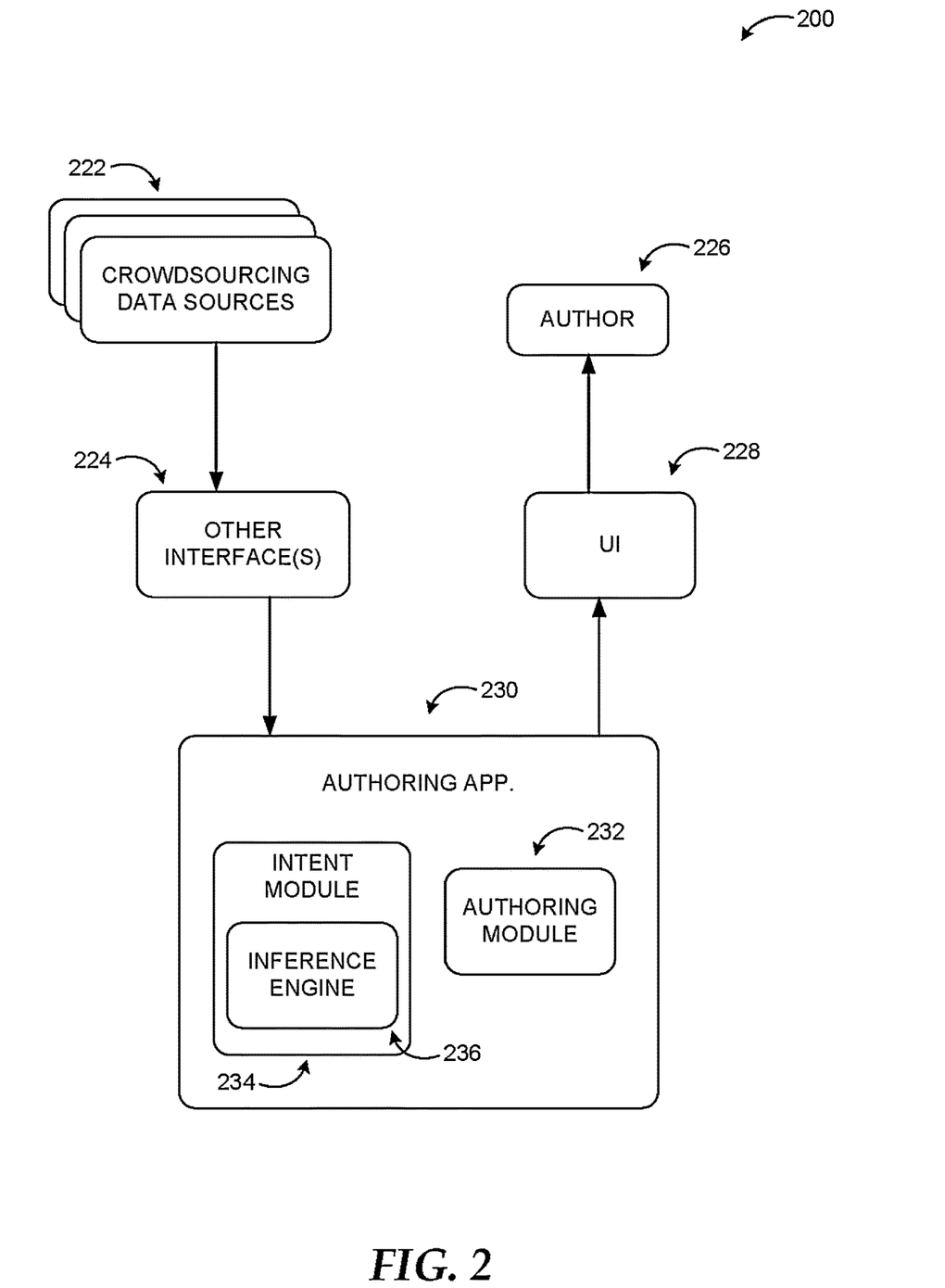
FIG. 2 illustrates components of an example system for authoring through crowdsourcing based suggestions according to embodiments.

Referring to FIG. 2, diagram 200 illustrates components of an example system for authoring, through crowdsourcing based suggestions according to embodiments. Created or modified content according to embodiments may include text, images, graphics, and/or embedded objects such as audio or video objects.

As shown in diagram 200, an example authoring application 230 may include an intent module 234 for determining user intent. In some examples, author intent may be determined from one or more author attributes such as an organizational position, a professional status, an identity, and/or a social status. The author attribute may be determined from the author's sign-on credentials, a computing device used to execute or access the authoring application or comparable methods. A document context such as a storage location (e.g., a cloud) for the content, related documents, prior versions, etc. may also be used to determine author intent. Furthermore, collaboration information such as identities attributes of the collaborators, a type of the collaboration project, and similar factors may also be considered. Moreover, a document attribute such as a type of the document containing the content, one or more restrictions imposed on the document, modifications to the document, and so on may also be used to determine, author intent.

In some examples, the author intent may be further determined from crowdsourcing information such as trends in the Internet, trends among peers, and/or organizational norms. As discussed above, crowdsourcing information may be collected from individual sources or received from crowdsourcing data sources 222, which may store already collected crowdsourcing data Authoring application 230 may receive such data through other interfaces 224 through push or pull type retrieval mechanisms. For example, the authoring applications may actively collect the data on-demand or receive periodic crowdsourcing data from one or more sources. An inference engine 236 within the intent module 234 may then make inference(s) and help determine author intent for the created/modified content.

An authoring module 232 within the authoring application 230 may identify one or more content actions based on the author intent. The content actions may include decisions on placement of content, formatting of content, style of content, relationships between content elements, sizing of content/content elements, layout of content elements, animations associated with content elements, motion paths for animated content elements, and or accessibility options (e.g., visual impairedness, readable text, etc.). These actions may be determined and automatically decided based on the author intent as well as crowdsourcing information (e.g., types of placement, style, formatting, etc.).

In other embodiments, content actions may include replacement of portions of the content. For example, images may be replaced with textual portions and vice versa or same type of portions (text, image, graphics, etc.) may be switched to emphasize the determined author intent. In addition, attributes of content elements such as font type, font size, boldness, etc. of textual content; frame type, size, shading of an image, thickness of lines, colors, and so on may be selected to emphasize the author intent and/or what is determined to be a theme of the created content. For example, upon determining the theme of the content, one or more sentences within the content summarizing or representing that theme may be bolded or italicized. Similarly, a title or header may be created and suitably placed based on the determined theme of the content.

Author 226 may be enabled to select presented suggestions through user interface (UI) 228 of the authoring application 230. Author 226 may also provide information about himself/herself (e.g., credentials) and/or the created/modified content through the UI 228 to the authoring application 230.

An authoring application according to embodiments may be part of a hosted service and accessed by a user through a thin or thick client application such as a browser. The authoring application may also be a locally installed and executed application.

Figure 3:
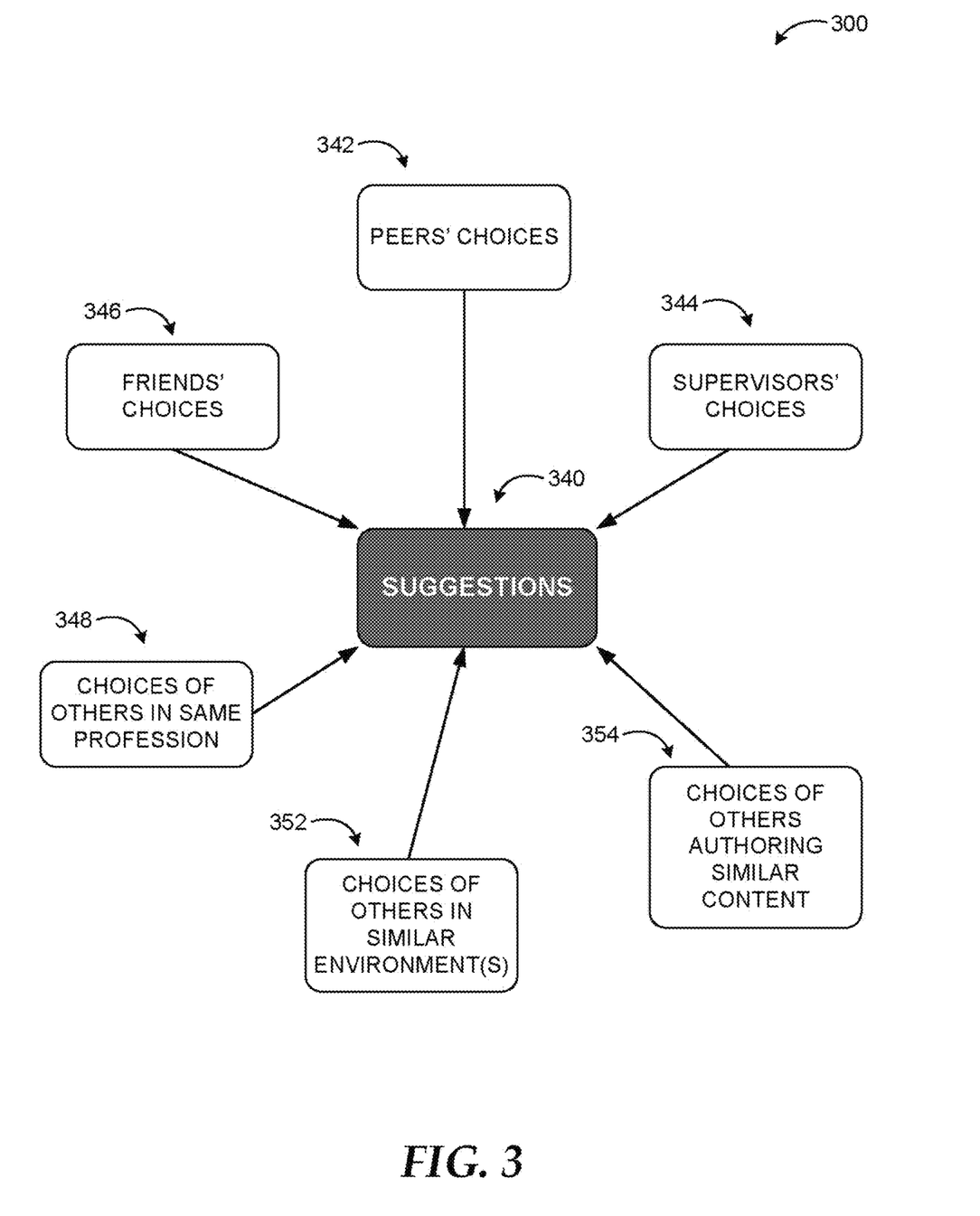
FIG. 3 illustrates example sources for crowdsourcing based suggestions according to some embodiments.

Referring to FIG. 3, diagram 300 illustrates example sources for crowdsourcing based suggestions according to some embodiments.

Crowdsourcing information may be received from individual or collective sources. Crowdsourcing information may include other people's choices, commonly used content attributes, and similar data Diagram 300 shows some illustrative examples of crowdsourcing information such as peer's choices 342, supervisor(s)'s choices 344, friends' choices 346, choices of others in the same profession 348, choices of others in similar environments 352 (e.g., a collaboration environment, a computing device used by the author, a network used by the author, etc.), choices of others authoring similar content 354, and comparable information.

The collected information may then be used by an inference engine or similar mechanism to generate suggestions for the author. Suggestions may be presented to the author using various visual schemes such as small multiples, representative documents, and similar mechanisms (e.g., a textual scheme, a graphic scheme, a shading scheme, a placement scheme, and/or a color scheme). Author intent may be inferred through direct or indirect means, compared to above-listed choices, and suggestions made based on user preferences, content type, and similar factors. Furthermore, a learning algorithm may be employed to dynamically adjust intent determination, content action identification, and crowdsourcing operations (e.g., which sources to use). Learning algorithms may also be used to detect applicable choices and/or adjust them to the author's intent (e.g. take a manager's style adjust to the author's).

Figure 4:
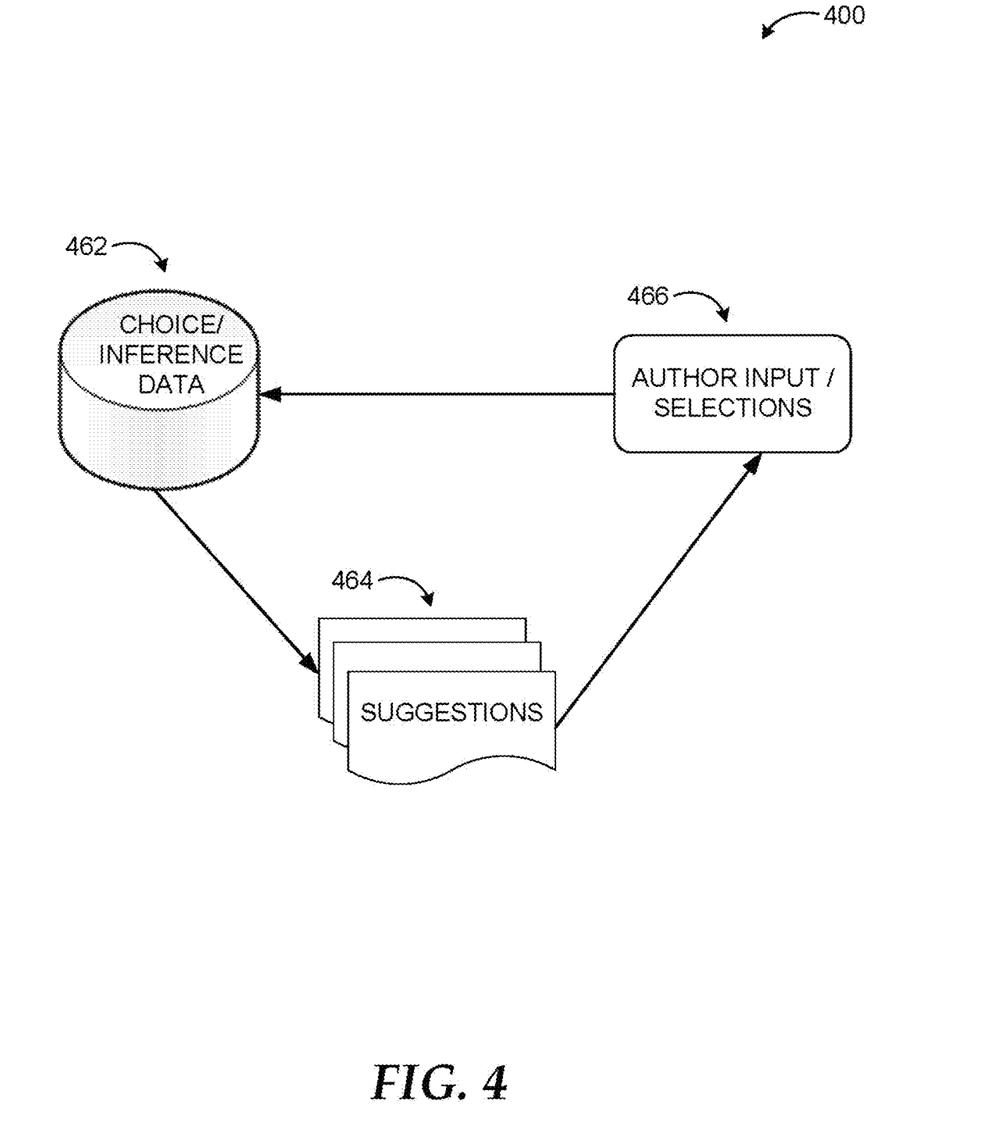
FIG. 4 illustrates example interactions for providing suggestions in system for authoring through crowdsourcing based suggestions according to other embodiments.

Referring to FIG. 4, diagram 400 illustrates example interactions for providing suggestions in system for authoring through crowdsourcing based suggestions according to other embodiments.

Diagram 400 shows choice and/or inference data 462 feeding to suggestions 464, which may be used for author selections 466. Author selections 466 may also be used as feedback/input for creating/adjusting, choice and/or inference data 462. Embodiments may be implemented in hosted services, locally installed applications (in networked communication with sources to gather inference choice information), across different platforms (mobile, stationary, etc.).

The examples in FIG. 1 through 4 have been described with specific user interface elements, configurations, and presentations. Embodiments are not limited to systems according to these example configurations. Authoring through crowdsourcing based suggestions may be implemented in configurations using other types of user interface elements, presentations, and configurations in a similar manner using the principles described herein.

Figure 5:
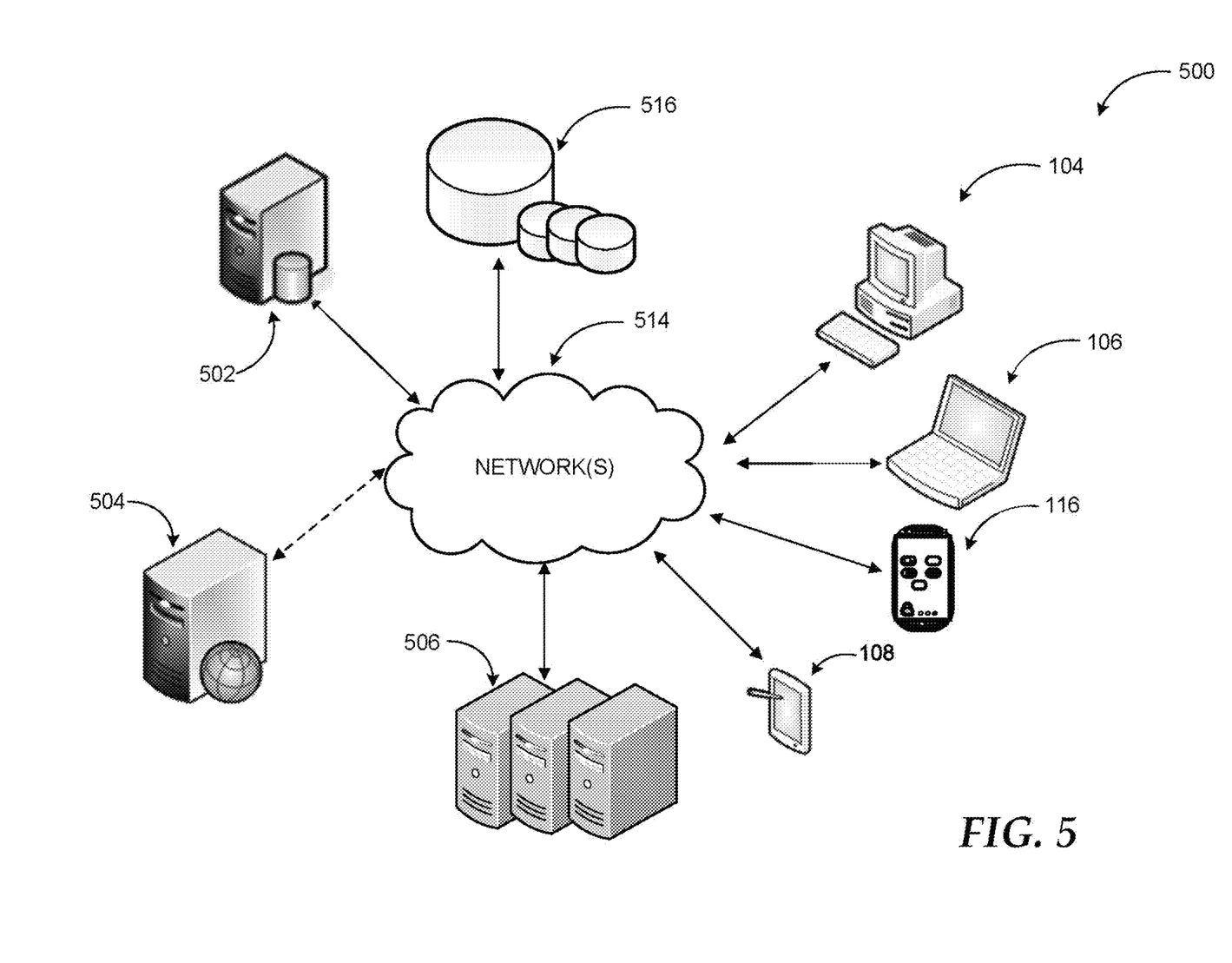
FIG. 5 is a networked environment, where a system according to embodiments may be implemented.

FIG. 5 is an example networked environment, where embodiments may be implemented. A system determining author intent and providing suggestions for content creation based on crowdsourcing information may be implemented via software executed over one or more servers 506 such as a hosted service. The platform may communicate with client applications on individual computing devices such as the desktop computer 104, laptop computer 106, smart phone 116, and tablet 108 (client devices') through network(s) 514.

Client applications executed on any of the client devices may facilitate communications with hosted authoring applications executed on servers 506, or on individual server 504. An authoring application executed on one of the servers may facilitate collection of crowdsourcing data, determination of author intent, presentation of suggested content actions, and implementation of selected content actions as discussed above. The authoring application may retrieve relevant data from data store(s) 516 directly or through database server 502, and provide requested services to the user(s) through the client devices.

Network(s) 514 may comprise any topology of servers, clients, Internet service providers, and communication media. A system according to embodiments may have a static or dynamic topology. Network(s) 514 may include secure networks such as an enterprise network, an unsecure network such as a wireless open network, or the Internet. Network(s) 514 may also coordinate communication over other networks such as Public Switched Telephone Network (PSTN) or cellular networks. Furthermore, network(s) 514 may include short range wireless networks such as Bluetooth or similar ones. Network(s) 514 provide communication between the nodes described herein. By way of example, and not limitation, network(s) 514 may include wireless media such as acoustic, RF, infrared and other wireless media.

Many other configurations of computing devices, applications, data sources, and data distribution systems may be employed to implement a platform for authoring through crowdsourcing based suggestions. Furthermore, the networked environments discussed in FIG. 5 are for illustration purposes only. Embodiments are not limited to the example applications, modules, or processes.

Figure 6:
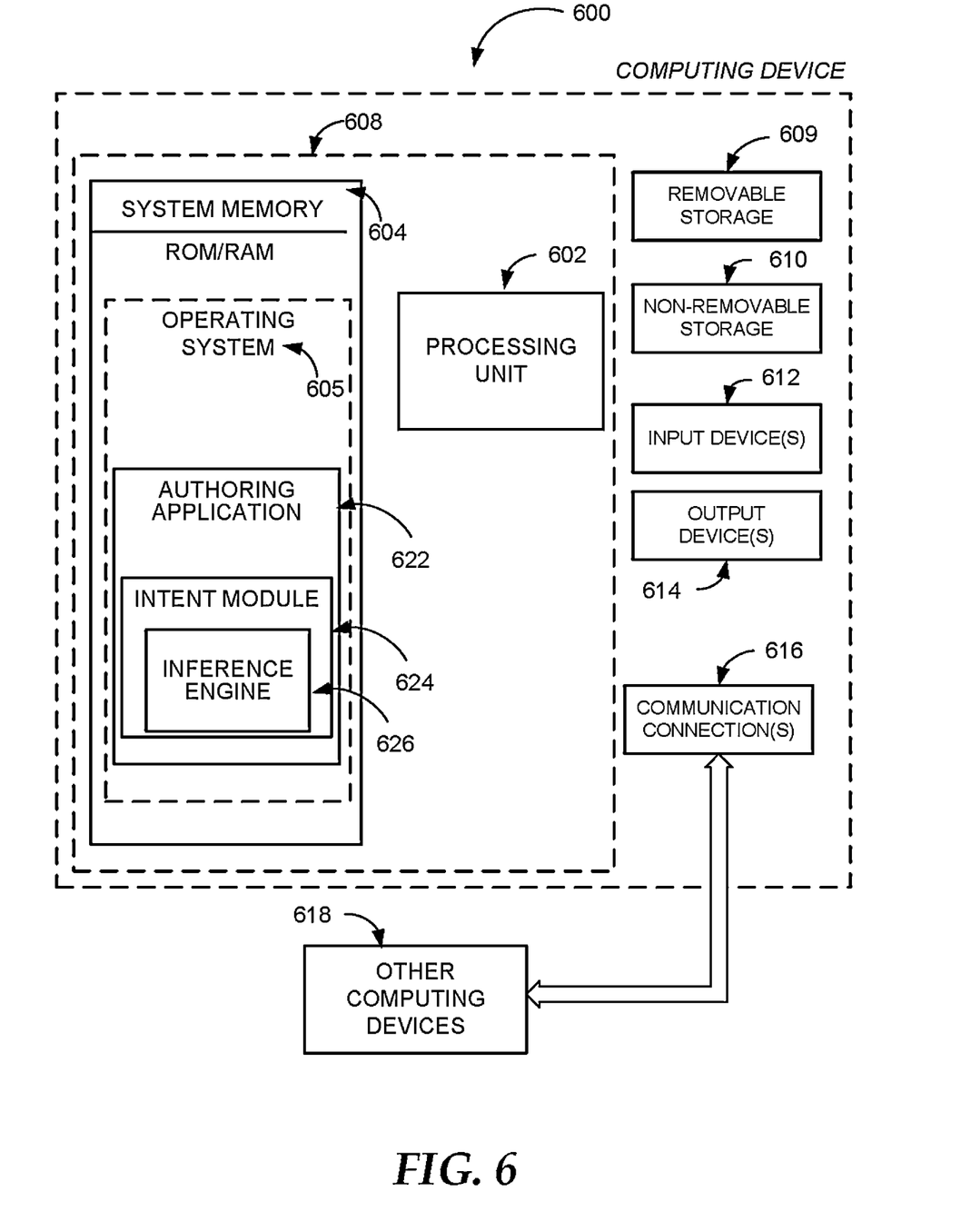
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as the computing device 600. In a basic configuration, computing device 600 may be any computing device with communication capabilities, and include at least one processing unit 612 and a system memory 604. The computing device 600 may also include a plurality of processing units that cooperate in executing programs. Depending on the exact configuration and type of computing device, a system memory 604 may be volatile (such as RAM), non-volatile (such as ROM, flash memory, etc.) or some combination of the two. The system memory 604 typically includes an operating system 605 suitable for controlling the operation of the platform, such as the WINDOWS®, WINDOWS MOBILE®, or WINDOWS PHONE® operating systems from MICROSOFT CORPORATION of Redmond, Wash. The system memory 604 may also include one or more software applications such as authoring application 622, intent module 624, and inference engine 626.

The authoring application 622 may determine through the intent module 624 and inference engine 626 an author's intent based on a number of factors associated with the author, the content being created, and an environment. The authoring application 622 may then provide suggestions for various content actions taking into consideration crowdsourcing information collected from individual and/or collective sources as described herein. The authoring application 622, the intent module 624, and the inference engine 626 may be separate applications or integrated modules of a hosted service. This basic configuration is illustrated in FIG. 6 by those components within a dashed line 608.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage 614 and a non-removable storage 616. Computer readable storage media may include volatile and nonvolatile, removable and non-removable media implemented in any method or technology for storage of information, such as computer readable instructions, data structures, program modules, or other data. The system memory 604, removable storage 614 and the non-removable storage 616 are all examples of computer readable memory device. Computer readable memory devices include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by the computing device 600. Any such computer readable storage media may be part of the computing device 600. The computing device 600 may also have the input device(s) 618 such as keyboard, mouse, pen, voice input device, touch input device, an optical capture device for detecting gestures, and comparable input devices. An output device(s) 620 such as a display, speakers, printer, and other types of output devices may also be included. These devices are well known in the art and need not be discussed at length here.

Some embodiments may be implemented in a computing device that includes a communication module, a memory device, and a processor, where the processor executes a method as described above or comparable ones in conjunction with instructions stored in the memory device. Other embodiments may be implemented as a computer readable memory device with instructions stored thereon for executing a method as described above or similar ones. Examples of memory devices as various implementations of hardware are discussed above.

The computing device 600 may also contain communication connections 622 that allow the device to communicate with other devices 626, such as over a wired or wireless network in a distributed computing environment, a satellite link, a cellular link, a short range network, and comparable mechanisms. Other devices 626 may include computer device(s) that execute communication applications, web servers and the comparable device 106. Communication connection(s) 622 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
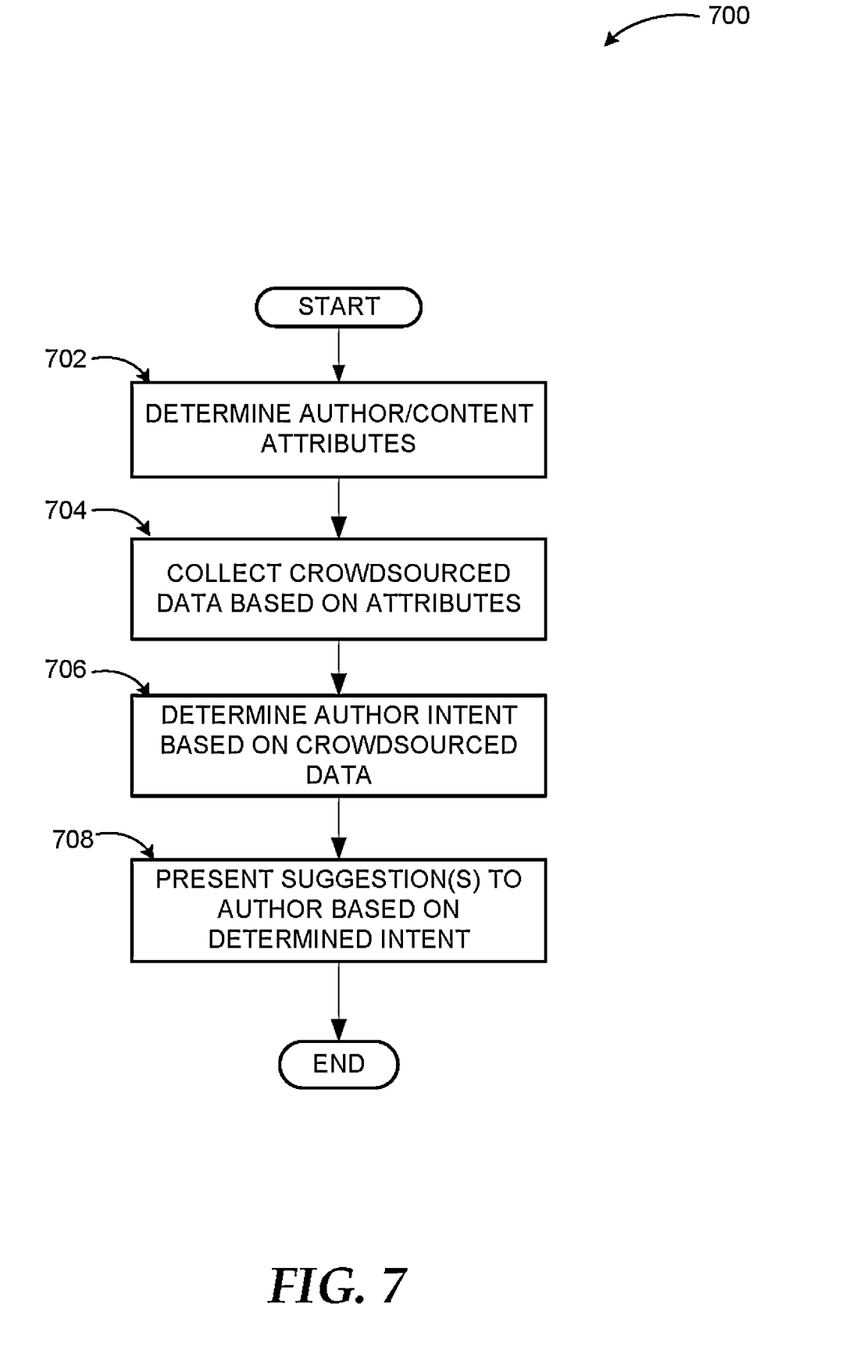
FIG. 7 illustrates a logic flow diagram for a process of authoring through crowdsourcing based suggestions according to embodiments.

FIG. 7 illustrates a logic flow diagram for a process 700 of authoring through crowdsourcing based suggestions according to embodiments. The process 700 may be implemented on a server or other computing device.

The process 700 begins with an operation 702, where one or more attributes of the author and/or the content being created/modified may be determined. The author's attributes may include their identity, organizational position, membership in a social or professional network, interests, profession, and similar ones. The attribute(s) of the content may include a type of the content, a context of the content, an environment in which the content is being created/modified, and so on. At operation 704, crowdsourcing information may be collected/received based on the determined attributes. For example, upon determining an organization of the author, peer's and supervisors' choices for content within the same organization or similar organizations may be collected.

At operation 706, author intent and suggestions for content actions such as placement, formatting, style, or layout of content may be determined based on the crowdsourcing information. Furthermore, relationships, sizes, animations associated with, motion paths, and comparable attributes of content elements may also be determined based on the author intent and crowdsourcing information.

At operation 708, the determined content actions may be suggested to the author enabling the author to see how the content looks if a suggested content action is selected. Visual schemes such as small multiples or galleries combining multiple properties of suggested content actions may be used to present the suggestions.

The operations included in the process 700 are for illustration purposes. Authoring through crowdsourcing based suggestions may be implemented by similar processes with fewer or additional steps, as well as in different order of operations using the principles described herein.

According to some examples, a means for authoring through crowdsourcing based suggestions may include a means for determining one or more attributes associated with an author and a content being created by the author; a means for receiving crowdsourcing data based on the one or more attributes; a means for determining an author intent at least partially based on the crowdsourcing data; a means for determining one or more content related suggestions based on the author intent and the crowdsourcing data; and a means for presenting the suggestions to the author for selection.

According to some examples, a method to be executed at least in part in a computing device for authoring through crowdsourcing based suggestions may include determining one or more attributes associated with an author and a content being created by the author; receiving crowdsourcing data based on the one or more attributes; determining an author intent at least partially based on the crowdsourcing data; determining one or more content related suggestions based on the author intent and the crowdsourcing data; and presenting the suggestions to the author for selection.

According to other examples, the method may further include implementing at least one of the suggestions in response to the selection. The method may also include collecting at least a portion of the crowdsourcing data from individual sources. The individual sources may include one or more of peers of the author, supervisors of the author, friends of the author, influencers, members of a social network of the author, members of a professional network of the author, others creating similar content, and others creating content in a similar environment as the author. The environment may include one or more of a collaboration environment, an authoring application used to create the content, a computing device used by the author, and a network used by the author to access resources associated with creating the content.

According to further examples, the method may further include receiving at least another portion of the crowdsourcing data from a collective crowdsourcing data source. Determining the content related suggestions may include determining one or more of a placement of the content, a formatting of the content, a style of the content, one or more relationships between content elements, a size of one or more content elements, an attribute of one or more content elements, a layout of the content elements, an animation associated with the one or more content elements, a motion path for the one or more content elements, and one or more accessibility options.

According to yet other examples, the method may include one or more of displaying the content related suggestions in an implemented mode such that the author views each suggestion as performed; and displaying the content related suggestions in galleries based on multiple properties of the content and content elements by applying changes directly on the content. Determining the author intent may further include analyzing one or more of an organizational position of the author, a professional status of the author, an identity of the author, a social status of the author, a storage location of the content, one or more documents related to the content, one or more prior versions of the content, a type of the content, a restriction imposed on the content, and one or more modifications on the content. The content may include one or more of text, an image, a graphic, and an embedded object.

According to other examples, a computing device for enabling content authoring through crowdsourcing based suggestions may include a memory, a display, and a processor coupled to the memory and the display. The processor may execute an authoring application, which may be configured to determine one or more attributes associated with an author and a content being created by the author; collect crowdsourcing data from one or more of individual sources and collective crowdsourcing data sources based on the one or more attributes; determine an author intent at least partially based on the crowdsourcing data; determine one or more content related suggestions based on the author intent and the crowdsourcing data; present the suggestions to the author for selection; and implement at least one of the suggestions in response to the selection.

According to further examples, the authoring application may be further configured to receive the crowdsourcing data through one of a pull mechanism collecting the crowdsourcing data on-demand and a push mechanism collecting the crowdsourcing data based on a subscription. The authoring application may also be configured to employ an inference engine executing a learning algorithm to dynamically adjust one or more of intent determination, suggestions identification, and crowdsourcing operations.

According to some examples, the inference engine may be further configured to detect the content related suggestions applicable to the author and adjust the suggestions based on the author intent using the learning algorithm. The author may be enabled to interact with the authoring application through one or more of a touch input, a gesture input, a keyboard input, a mouse input, a pen input, a voice command, and an eye tracking input. The authoring application may be a locally installed application or a hosted service, and the computing device may be a server, a desktop computer, a laptop computer, a tablet, a smart whiteboard, or a smart phone.

According to further examples, a computer-readable memory device with instructions stored thereon for authoring through crowdsourcing based suggestions is described. The instructions may include determining one or more attributes associated with an author and a content being created by the author; collecting crowdsourcing data from one or more of individual sources and collective crowdsourcing data sources based on the one or more attributes; determining an author intent at least partially based on the crowdsourcing data; determining one or more content related suggestions based on the author intent and the crowdsourcing data; presenting the suggestions to the author for selection; and implementing at least one of the suggestions in response to the selection.

According to some examples, the instructions may further include presenting the suggestions employing one or more of a textual scheme, a graphic scheme, a shading scheme, a placement scheme, and a color scheme. The instructions may also include enabling selection of two or more suggestions combining multiple properties of content attributes. The instructions may further include adjusting collection of crowdsourcing data based on author selections of the presented suggestions and author preferences.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for authoring through crowdsourcing based suggestions, the method comprising:
   determining, via an authoring application, one or more attributes associated with an author and a content being created by the author;
   receiving, via the authoring application, crowdsourcing data based on the one or more attributes;
   executing an intent module of the authoring application, including a learning algorithm, to automatically determine an author intent based, at least in part, on integrating the crowdsourcing data with the one or more attributes associated with the author and the content being created by the author;
   executing an inference engine of the intent module to dynamically generate one or more content related suggestions using the author intent and the crowdsourcing data; and
   automatically implementing, via the authoring application, a first of the content related suggestions to emphasize the determined author intent;
   determining a theme of the content being created by the author; and
   automatically implementing, via the authoring application, a second of the content related suggestions to emphasize the determined author intent based on the determined theme of the content.

2. The method of claim 1, further comprising:
   presenting one or more additional content related suggestions for selection; and
   implementing at least one of the additional content related suggestions in response to the selection.

3. The method of claim 2, further comprising one or more of:
   displaying the content related suggestions in an implemented mode such that the author views each suggestion as performed; and
   displaying the content related suggestions in galleries based on multiple properties of the content and content elements by applying changes directly on the content.

4. The method of claim 1, further comprising:
   collecting at least a portion of the crowdsourcing data from individual sources.

5. The method of claim 4, wherein the individual sources include one or more of peers of the author, supervisors of the author, friends of the author, influencers, members of a social network of the author, members of a professional network of the author, others creating content, and others creating content in an environment as the author.

6. The method of claim 5, wherein the environment includes one or more of a collaboration environment, an authoring application used to create the content, a computing device used by the author, and a network used by the author to access resources associated with creating the content.

7. The method of claim 1, further comprising:
   receiving at least another portion of the crowdsourcing data from a collective crowdsourcing data source.

8. The method of claim 1, wherein determining the content related suggestions comprises determining one or more of a placement of the content, a formatting of the content, a style of the content, one or more relationships between content elements, a size of one or more content elements, an attribute of one or more content elements, a layout of the content elements, an animation associated with the one or more content elements, a motion path for the one or more content elements, and one or more accessibility options.

9. The method of claim 1, wherein determining the author intent further comprises analyzing one or more of an organizational position of the author, a professional status of the author, an identity of the author, a social status of the author, a storage location of the content, one or more documents related to the content, one or more prior versions of the content, a type of the content, a restriction imposed on the content, and one or more modifications on the content.

10. The method of claim 1, wherein the content includes one or more of text, an image, a graphic, and an embedded object.

11. A method for enabling content authoring through crowdsourcing based suggestions using an authoring application implemented on a computing device, the method comprising:
    determining, via the authoring application, one or more attributes associated with an author and a content being created by the author;
    collecting, via the authoring application, crowdsourcing data from one or more of individual sources and collective crowdsourcing data sources based on the one or more attributes;
    executing an intent module of the authoring application, including a learning algorithm, to determine an author intent by at least partially integrating the crowdsourcing data, the one or more author attributes, a content context, collaboration information, and a document attribute, where the one or more author attributes include at least an organizational position of the author, a professional status of the author, and an identity of the author;
    executing an inference engine of the intent module to dynamically generate one or more content related suggestions using the author intent and the crowdsourcing data;
    determining a theme of the content being created by the author; and
    automatically implementing, via the authoring application, at least one of the content related suggestions to emphasize the determined author intent based on the determined theme of the content by bolding or italicizing one or more sentences within the content representing the theme.

12. The method of claim 11, further comprising receiving the crowdsourcing data through one of a pull mechanism collecting the crowdsourcing data on-demand and a push mechanism collecting the crowdsourcing data based on a subscription.

13. The method of claim 11, further comprising employing an inference engine executing a learning algorithm to dynamically adjust one or more of intent determination, suggestions identification, and crowdsourcing operations.

14. The method of claim 13, wherein the inference engine is further configured to detect the content related suggestions applicable to the author and adjust the suggestions based on the author intent using the learning algorithm.

15. The method of claim 11, wherein the author is enabled to interact with the authoring application through one or more of a touch input, a gesture input, a keyboard input, a mouse input, a pen input, a voice command, and an eye tracking input.

16. The method of claim 11, wherein the authoring application is one of a locally installed application and a hosted service, and the computing device is one of: a server, a desktop computer, a laptop computer, a tablet, a smart whiteboard, and a smart phone.

17. A non-transitory computer-readable medium with instructions stored thereon for authoring through crowdsourcing based suggestions, the instructions comprising:

determining, via an authoring application, one or more attributes associated with an author and a content being created by the author;

collecting, via the authoring application, crowdsourcing data from one or more of individual sources and collective crowdsourcing data sources based on the one or more attributes;

executing an intent module of the authoring application to determine an author intent by at least partially integrating the crowdsourcing data, the one or more author attributes, a content context, collaboration information, and a document attribute where the one or more author attributes include at least a professional status of the author, an organizational position of the author, and an identity of the author;

executing an inference engine of the intent module to dynamically generate one or more content related suggestions using the author intent and the crowdsourcing data;

automatically implementing, via the authoring application, a first of the content related suggestions to emphasize the determined author intent;

executing a learning algorithm to dynamically adjust the one or more content related suggestions based on an identified change to at least the one or more author attributes; and automatically implementing, via the authoring application, a second of the content related suggestions to emphasize the determined author intent based on the adjusted one or more content related suggestions.

18. The non-transitory computer-readable medium of claim 17, wherein the instructions further comprise presenting the suggestions employing one or more of a textual scheme, a graphic scheme, a shading scheme, a placement scheme, and a color scheme.

19. The non-transitory computer-readable medium of claim 17, wherein the instructions further comprise enabling selection of two or more suggestions combining multiple properties of content attributes.

20. The non-transitory computer-readable medium of claim 17, wherein the instructions further comprise adjusting collection of crowdsourcing data based on author selections of the presented suggestions and author preferences.

* * * * *